United States Patent Office 2,997,481
Patented Aug. 22, 1961

2,997,481
PHTHALIDES
Donald D. Wheeler and David C. Young, Midland, Mich., assignors to The Dow Chemical Company, Midland, Mich., a corporation of Delaware
No Drawing. Filed Sept. 2, 1958, Ser. No. 758,599
6 Claims. (Cl. 260—343.3)

This invention is concerned with phthalides having the formula

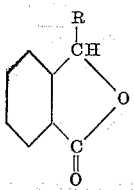

In this and succeeding formulae, R represents a secondary amino radical selected from the group consisting of

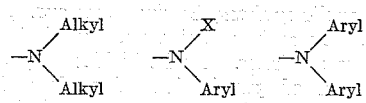

wherein the alkyl radical contains from 1 to 8 carbon atoms, inclusive, X is selected from the group consisting of alkenyl and chloroalkenyl containing from 3 to 4 carbon atoms, inclusive, and the aryl radical is selected from the group consisting of phenyl, nitrophenyl, lower alkylphenyl and lower alkoxyphenyl. By "lower alkyl" and "lower alkoxy" in the radicals "lower alkylphenyl" and "lower alkoxyphenyl" are meant those radicals containing from 1 to 4 carbon atoms, inclusive. Representative alkyl radicals include normal-propyl, isopropyl, amyl, normal-hexyl, 1,1-dimethylpropyl, and hexyl. Radicals representative of X include allyl, 2-methylallyl, crotyl, 3,3-dichloro-2-methylallyl and 3-chloro-2-methylallyl. Representative aryl radicals include 3-nitrophenyl, 3-methoxyphenyl, o-tolyl, 4-isopropylphenyl, 4-tertiary-butylphenyl, 2-ethoxyphenyl, 4-butoxyphenyl and 2-ethylphenyl.

The new compounds are amber or colorless liquids, or light colored crystalline solids. They are somewhat soluble in the common organic solvents such as benzene, acetone and ethanol, and are substantially insoluble in water. These compounds exhibit biological activity and are useful as toxicants in fungicidal, germicidal and herbicidal compositions.

The above compounds may be prepared by causing phthalaldehydic acid to react with a secondary amine having the formula, RH, to produce the desired phthalide and water of reaction. The terms "phthalaldehydic acid" and "3-hydroxyphthalide" refer to a compound having the structure

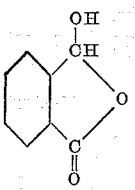

Phthalaldehydic acid is often represented in the literature as having the structure

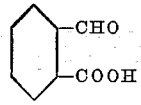

However, the acid employed in this invention and prepared as hereinafter described consists almost entirely of 3-hydroxy-phthalide ring structure, as indicated by its infrared absorption spectrum. Infrared data also indicate the phthalide products to have the ring structure.

The reaction takes place readily in the temperature range of from 20° to 150° C. with the formation of the desired compound and water of reaction. It is preferably carried out in an inert solvent as reaction medium. Suitable solvents include acetone, benzene, butanone, water and alcohol. Good results are obtained when substantially equimolar proportions of the reactants are employed, however, a reasonable excess of either reactant does not interfere with the reaction. A large excess of phthalaldehydic acid and particularly at elevated temperatures, may form an anhydride by-product.

In one method of carrying out the reaction, phthalaldehydic acid and the amine are dissolved in or mixed with the reaction solvent. Mixing of the reactants and solvent results in the development of heat of reaction. The resulting mixture is then heated for a period of from a few minutes to four hours during which time the desired phthalide product usually precipitates in the reaction mixture. After completion of the heating period, the reaction mixture is allowed to cool and the phthalide product, if a solid, is separated therefrom by filtration. The product may be purified, if desired, by washing or by recrystallization. The product, if a liquid, is recovered from the mixture by heating the latter, preferably at reduced pressure, to distill off the solvent and water of reaction.

In an alternative method for carrying out the reaction, phthalaldehydic acid and the appropriate amine are mixed in an inert solvent which is capable of forming azeotropic mixtures with water. The mixing step is usually accompanied by a heat of reaction. Thereafter, the mixture is heated to complete the reaction, if necessary, and to distill off first the water of reaction as an azeotropic mixture, and then the reaction solvent, the desired reaction product being obtained as a residue. In such operation the distillation is usually carried out at temperatures of from 30° C. to 50° C. and at pressures of from 15 millimeters to 300 millimeters.

The following examples illustrate the invention but are not to be construed as limiting.

*Example 1.—3-(di-normal-octylamino)phthalide*

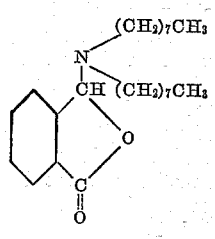

40.8 grams (0.169 mole) of dioctylamine, 25.4 grams (0.169 mole) of phthalaldehydic acid and 150 milliliters of benzene were mixed together. Evolution of heat accompanied the mixing and external cooling was employed. The reaction mixture was then heated at about 80° C. under reflux for about one hour to produce a 3-di-normal-octylaminophthalide product and water of reaction. The latter separated in the mixture during the heating and distilled from the reaction zone along with benzene in an azeotropic mixture. Thereafter, the pressure was reduced gradually to about 15 millimeters and the heating continued to distill benzene and other low-boiling material and to recover as a residue the desired product in a yield of 67.5 grams or 99 percent of theoretical. The latter was an amber-colored oil having a refractive index, $n_D^{20°}$ of 1.496.

Example 2.—3-diphenylaminophthalide

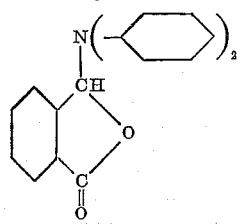

33.8 grams (0.2 mole) of diphenylamine, 30.0 grams (0.2 mole) of phthalaldehydic acid and 150 milliliters of benzene were mixed and heated on the steam bath under reflux for 4 hours. Thereafter, most of the benzene was removed by evaporation to obtain in the residue a 3-diphenylaminophthalide product which solidified on cooling. The solid was separated from the residue mixture by filtration, washed successively with benzene and alcohol, and then dried to obtain a purified phthalide product melting at 137°–138° C.

Example 3.—3-(N-(2-chloroallyl)anilino)phthalide

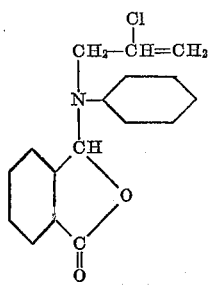

41.9 grams (0.25 mole) of N-(2-chloroallyl)aniline, 37.5 grams (0.25 mole) of phthalaldehydic acid and 50 milliliters of acetone were mixed together and the resulting mixture heated on the steam bath for one hour. After completion of the heating the reaction mixture was cooled whereupon crystals of a 3-(N-(2-chloroallyl)anilino)phthalide product precipitated. The latter was separated from the reaction mixture by filtration, and washed with acetone to obtain a purified product melting at 120°–121° C.

Example 4.—3-Dimethylaminophthalide 60.0 grams (0.3 mole) of a 25 percent aqueous solution of dimethylamine and 45.0 grams (0.3 mole) of phthalaldehydic acid were mixed together and the resultant solution heated on the steam bath for a period of one hour. During the heating period, the solution was partially evaporated under a stream of air and the volume thereof reduced to about one-half. Thereafter the solution was cooled to obtain a dimethylaminophthalide product as a crystalline precipitate. The latter was removed from the reaction mixture by filtration, washed with cold water and dried to recover a purified product melting at 89.5°–90° C.

In preparations carried out in a manner similar to that described in Example 2, the following phthalides were prepared:

A 3-(N-(4-nitrophenyl)anilino)phthalide product melting at 185°–186° C. by the reaction of phthalaldehydic acid with N-4-nitrophenylaniline.

A 3-(bis(4-methoxyphenyl)amino)phthalide product melting at 225°–226° C. by the reaction of phthalaldehydic acid with 4,4'-dimethoxydiphenylamine.

A 3-dibutylaminophthalide product having a refractive index, $n_D^{25}$ of 1.511 by the reaction of phthalaldehydic acid with dibutylamine.

In similar preparations, the following phthalides are prepared:

3-(bis(m-ethylphenyl)amino)phthalide having a molecular weight of 357 by the reaction of phthalaldehydic acid with 3,3'-diethyldiphenylamine.

3-(N-crotylanilino)phthalide having a molecular weight of 279 by the reaction of phthalaldehydic acid with N-crotylaniline.

3-(N-allyl-o-toluidino)phthalide having a molecular weight of 279 by the reaction of phthalaldehydic acid with N-allyl-o-toluidine.

Other phthalides embraced in the present invention include 3-(bis(p-normal-butylphenyl)amino)phthalide, 3-(bis(4-ethoxyphenyl)amino)phthalide, 3-(N-(4-isoproxyphenyl)anilino)phthalide, 3 - (N - (2 - methylallyl( - 4-nitrophenyl)amino)phthalide and 3-diamylaminophthalide.

The phthalides having the formula

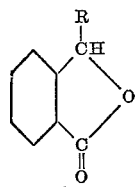

are useful as parasiticides and herbicides. They are thus adapted to be employed for the control of bacteria and fungi such as *Staphylococcus aureus*, *Aerobacter aerogenes*, *Salmonella typhosa*, *Erwinia carotovora*, *Aspergillus terreus*, *Penecillium digitatum*, *Pullularis pullulans* and *Rhizopus nigricans*. As herbicides they are useful for the control of germination of seeds and of root growth of seedlings of canary grass, *Phalaris canariensis*, and rape, *Brassica napus*. The phthalides having the structure

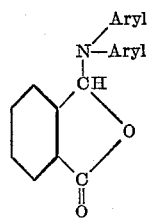

are particularly useful for the control of canary grass. In a representative operation, 3-(diphenylamino)phthalide is dispersed in water to prepare aqueous compositions containing 100 parts by weight of the phthalide compound per million parts by weight of ultimate composition. These compositions are applied to seed germination beds which have been prepared and planted with seeds of canary grass (*Phalaris canariensis*) at a dosage of about 0.152 acre inch of aqueous composition per acre. Other seed beds similarly prepared and planted are left untreated to serve as checks. The beds are covered and maintained at about 70° F. for 1.5 weeks. At the end of this period, the beds are examined to ascertain the extent of control of root growth from the seedlings. It is found that there is substantially complete control of germination and root growth of the seeds and seedlings in the beds treated with the phthalide compound and no control of germination and growth in the untreated checks.

The phthalides having the structure

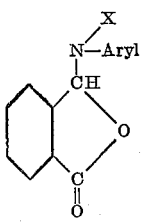

are particularly useful as bactericides and fungicides. In a representative operation, 3-(N-(2-chloroallyl)anilino) phthalide is dispersed in nutrient agar medium to produce a culturing medium containing 0.05 percent by weight of 3-(N-(2-chloroallyl)anilino)phthalide. The resulting medium as well as a check medium containing no phthalide compound are poured into separate Petri dishes and thereafter inoculated with *Staphylococcus aureus* and *Salmonella typhosa*. The dishes are incubated for 3 days at 30° C. and thereafter examined. It is found that the surfaces of the dishes containing 3-(N-(2-chloroallyl)anilino)phthalide show complete absence of bacterial growth whereas the surfaces of the checks show heavy growth of both organisms.

In a similar operation, 3-(N-(2-chloroallyl)anilino) phthalide is dispersed in a malt yeast agar medium to produce a modified medium containing 0.05 percent by weight of 3-(N-(2-chloroallyl)anilino)phthalide. The resulting medium as well as a check medium containing no phthalide compound are plated, inoculated with *Rhizopus nigricans* and *Aspergillus terreus* in separate operations and incubated as previously described and thereafter examined for the growth of the fungal organisms. The surfaces of the plates containing 3-(N-(2-chloroallyl)anilino) phthalide show no growth of the test organisms whereas the checks show prolific growth of organisms.

The phthalides having the structure

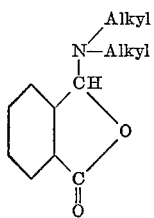

are particularly useful for the control of sporulation of cecal coccidiosis organisms and the germination of spores of fungi. In a representative operation, an aqueous dispersion containing 3-(dioctylamino)phthalide and a control dispersion containing no added compound are inoculated with an aqueous suspension of the cecal coccidiosis organism, *Eimeria tenella*. Similar aqueous suspensions are inoculated with the spores of the fungus, *Alternaria solani*. The inoculated suspensions are incubated in a moist chamber at 72° F. for 24 hours. At the end of this period, the compositions are examined under the microscope and compared with a control sample to determine the effectiveness of the compounds on control of sporulation and of germination. The results obtained are as follows:

| Organism | Concentration in Parts Per Million Parts of Aqueous Dispersion | Percent Control |
|---|---|---|
| *Alternaria solani* | 50 | 100 |
| *Eimeria tenella* | 500 | 100 |
| Do | 5 | 100 |

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene is then heated with aqueous constant boiling hydrochloric acid and ferric chloride solution, as more fully disclosed and claimed in U.S. 2,748,162.

This application is a continuation-in-part of copending application Serial Nmber 595,846, filed July 5, 1956, now abandoned.

We claim:
1. A phthalide having the formula

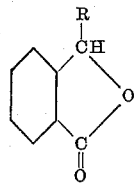

wherein R represents a secondary amino radical of the formula

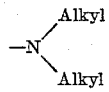

wherein the alkyl radical contains from 1 to 8 carbon atoms, inclusive.
2. 3-(dioctylamine)phthalide.
3. 3-(diphenylamino)phthalide.
4. 3-(N-(2-chloroallyl)anilino)phthalide.
5. A phthalide having the formula

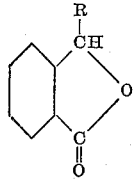

wherein R represents a secondary amino radical of the formula

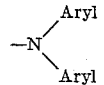

wherein the aryl radical is selected from the group consisting of phenyl, nitrophenyl, lower alkylphenyl and lower alkoxyphenyl.
6. A phthalide having the formula

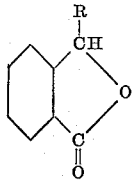

wherein R represents a secondary amino radical of the formula

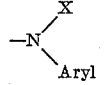

wherein X is selected from the group consisting of alkenyl and chloroalkenyl containing from 3 to 4 carbon atoms, inclusive, and the aryl radical is selected from the group consisting of phenyl, nitrophenyl, lower alkylphenyl and lower alkoxyphenyl.

References Cited in the file of this patent

Glogauer: Berichte, vol. 29, pages 2036–2039 (1896).